Figure 1:
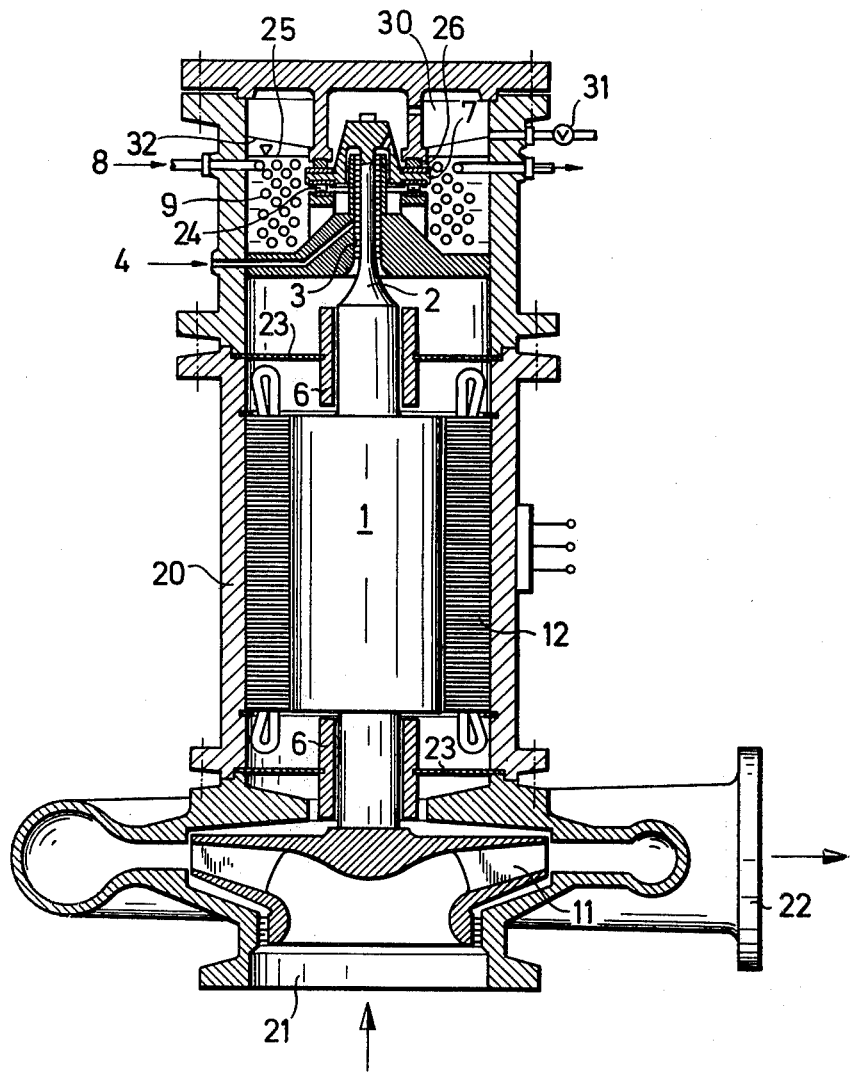

United States Patent [19]

Strub

[11] 3,999,897
[45] Dec. 28, 1976

[54] PUMP SUPPORTED BY A FLUID-ISOLATED, LIQUID-LUBRICATED THRUST BEARING

[75] Inventor: René Strub, Winterthur, Switzerland

[73] Assignee: Sulzer Brothers Limited, Winterthur, Switzerland

[22] Filed: Mar. 18, 1974

[21] Appl. No.: 452,253

[30] Foreign Application Priority Data

Mar. 22, 1973 Switzerland .................... 4156/73

[52] U.S. Cl. .......................... 417/424; 308/231; 415/112; 415/175; 417/365; 417/366
[51] Int. Cl.² ...................................... F04B 17/00
[58] Field of Search ................ 417/424, 365, 366; 415/104, 107, 110, 111, 112, 175, 176, 178, 180, 501; 308/227, 231, 219, 36, 134.1, 139, 140; 184/6.4, 6.18

[56] References Cited

UNITED STATES PATENTS

| | | | |
|---|---|---|---|
| 1,259,437 | 3/1918 | Paulsmeier | 415/180 |
| 1,961,134 | 6/1934 | Buckwalter | 308/35 X |
| 2,293,616 | 8/1942 | Myers | 415/501 X |
| 2,542,896 | 2/1951 | Brady | 417/424 |
| 2,667,127 | 1/1954 | Rimann | 417/424 X |
| 3,135,211 | 6/1964 | Pezzillo | 417/365 X |
| 3,617,156 | 11/1971 | Schiele | 417/365 |
| 3,880,479 | 4/1975 | DeFeo et al. | 308/36 |

FOREIGN PATENTS OR APPLICATIONS

| | | | |
|---|---|---|---|
| 667,266 | 7/1963 | Canada | 415/180 |
| 1,235,057 | 3/1960 | France | 417/424 |
| 1,403,838 | 10/1969 | Germany | 417/424 |

*Primary Examiner*—Carlton R. Croyle
*Assistant Examiner*—Edward Look
*Attorney, Agent, or Firm*—Kenyon & Kenyon Reilly Carr & Chapin

[57] ABSTRACT

The weight of the rotor of the machine is carried by a liquid lubricated thrust bearing while being guided by one or more gas lubricated centering elements. The thrust bearing is isolated from the rotor casing so that the lubricating liquid cannot contaminate the pumped gas. The machine is constructed for ratings in excess of 500 kw.

11 Claims, 2 Drawing Figures

PUMP SUPPORTED BY A FLUID-ISOLATED, LIQUID-LUBRICATED THRUST BEARING

This invention relates to a machine for pumping gases particularly in a nuclear power plant and, more particularly, to a machine of a rating in excess of 500 kilowatts.

Heretofore, various types of machines have been known which utilize rotors for pumping or compressing gases. It has also been known to lubricate the support bearings of these machines with the pumped or compressed gas itself or with a gas which is used for cooling the prime mover (Swiss Patent Specification Nos. 480,543 and 344,128). Gas lubricated bearings consume low frictional power and are suitable for relatively high rotational speeds. The reduction of friction power leads to a reduction of the maximum temperatures. Furthermore, compared with liquid lubricated bearings, gas lubricated bearings offer the advantage of not adding any undesirable liquid admixtures to the delivered gas.

However, there is the disadvantage that when compared with liquid lubricated bearings, gas lubricated bearings can be only very lightly loaded. The use of such bearings has therefore been hitherto confined to small machines. Even at ratings of only 500 kilowatts (kW), reliable operation can be maintained only with difficulty in view of the weight of the rotor required for this rating because specific loading in excess of 1 kilogram per square centimeter ($kg/cm^2$) in gas lubricated bearings do not reliably avoid metallic contact between the shaft and the bush which define the gas bearing.

In one known machine, a shaft is horizontally disposed in a casing and is provided with two gas lubricated radial bearings and a gas lubricated thrust bearing. The gas which surrounds the rotor for cooling purposes is used for lubrication and the rotor weight is supported by the radial bearings. However, the weight of the rotor and, therefore, the output of the machine is thus limited because of the low load-bearing capacity of gas lubricated bearings. The thrust bearing on the other hand is only lightly loaded and therefore does not limit the rotor weight and, therefore, the machine output to such a low value. In another known machine, the rotor is perpendicularly disposed in the machine casing so that the radial bearings are relieved of the deadweight. The thrust bearing is also lubricated by the conveyed gas which is supplied under elevated pressure. The same gas also lubricates the thrust bearing system. This arrangement, however, reduces the upper load limit still further because the thrust loading cannot be distributed over two or more bearings in the same way as the radial loading.

These prior machines have thus not been able to satisfy the problem of avoiding contact between the conveyed gas and an interfering lubricant while operating with the least possible loss due to bearing friction. This problem applies particularly to machines with outputs in excess of 500 kilowatts (kW) and is an essential condition for outputs in excess of 2,000 kilowatts (kW). Further, it is a compelling necessity, more particularly in nuclear power stations, to protect the conveyed gas from any contact with other gases or even harmful substances.

Accordingly, it is an object of the invention to operate a gas conveying machine with the least possible losses due to bearing friction and by avoiding any contact between the conveyed gas and a lubricant.

It is another object of the invention to provide a gas lubricated and liquid lubricated arrangement for supporting a rotor of a gas conveying machine with a rating in excess of 500 kilowatts (kW).

Briefly, the invention provides a machine for conveying gas which uses a rotor that is perpendicularly disposed with its weight transmitted to a liquid lubricated thrust bearing by means of a shaft which is not loaded by the driving torque and which has a diameter smaller than that of the rotor. Furthermore, a means is provided for lubricating the thrust bearing with cooled liquid. This means includes a heat exchanger element which is supplied with recoolant for recooling the lubricating liquid. Also, the rotor is centered with respect to the casing by at least one element which has a cylindrical bore surrounding part of the rotor with a clearance to form a film of gas. Finally, the shaft of reduced diameter for transmitting the weight is surrounded by a gland to which gas is supplied as barrier medium. The barrier gas must therefore be neutral with respect to the conveyed gas. It is appropriate for conveyed gas itself to be used as the barrier medium.

In one embodiment, a means is provided for forming an emergency thrust bearing upon movement of the rotor in a downward direction in response to failure of the thrust bearing about the shaft. Thus, should failure occur in the main thrust bearing, the rotor may drop while its weight is supported by the emergency thrust bearing until slowing to a halt.

Figure 2:
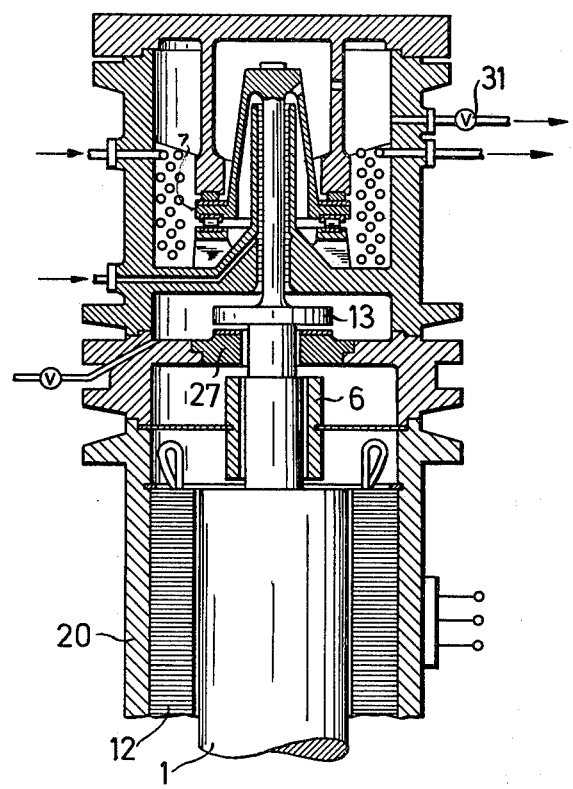

These and other objects and advantages of the invention will become more apparent from the following detailed description and appended claims taken in conjunction with the accompanying drawings in which:

FIG. 1 illustrates a diagrammatic longitudinal section through a machine according to the invention; and FIG. 2 illustrates a modified machine according to the invention with a means to form an emergency thrust bearing.

Referring to FIG. 1, the machine is constructed to convey a gas such as by pumping, compressing or otherwise. The machine includes a rotor 1 on which at least one each of an impeller 11 and an electric motor 12 are disposed. The rotor 1, impeller 11 and motor 12 are housed in a gas tight casing or housing 20 which is connected by means of a flange 21 to a supply duct and by means of a flange 22 to a delivery duct. The interior of the machine is therefore hermetically sealed with respect to the ambient zone.

The casing 20 is positioned in the vertically upright state so that the axis of the rotor 1 also extends vertically and the weight of the rotor 1 can be supported solely by a liquid lubricated thrust bearing 7. This thrust bearing 7 is mounted in the casing 20 as shown so that the weight of the rotor 1 is transferred to the casing 20. In addition, the thrust bearing 7 is mounted on a member which subdivides the casing 20 into two vertically aligned chambers and is constructed as a roller bearing with load-supporting rollers 24. The bearing 7 is lubricated with cooled liquid by a means including a bath 25 of lubricating liquid in the upper chamber of the casing 20 in which the load-supporting rollers 24 are immersed. In order to cool the lubricant, the lubricating means includes a heat exchanger element 9 in the chamber which is supplied through the duct 8 with coolant. the lubricant can also be exchanged from time to time. In operation, the lubricant bath surface 32 assumes a paraboloid shape which is defined on the one hand by the rotating bearing parts and on the other hand by the stationary parts. The running elements 26 of the thrust bearing 7 are not required to transmit any significant forces and are provided merely as a safety limitation of the bearing clearance and may in turn be constructed of a self lubricating material.

The rotor 1 is suspended from the thrust bearing 7 by means of a shaft 2 whose diameter is smaller than that of the rotor 1. The diameter and rolling surface of the thrust bearing 7 can therefore be constructed so as to maintain the optimum compromise between the rolling surface and rolling velocity.

The shaft 2 is also surrounded by a gland 3 which substantially comprises a labyrinth. This gland 3 is supplied, at a suitable middle position through a connection 4 with a barrier gas whose pressure is higher than the conveyed gas pressure which prevails during operation in the casing 20 in the zone of the shaft 2. The barrier gas may, for example, be conveyed gas which is obtained from the delivery duct connected to the flange 22. The space 30 above the lubricant is appropriately connected via a restrictor 31 or other suitable means to a position of lower pressure so that an upwardly orientated gas flow is produced in the gland 3 from the barrier medium supply position onwards in order to prevent the ingress of lubricating oil into the gland 3 from the bath 25.

Centering elements 6 which are mounted by means of diaphragms 23 on the casing 20 are used to center the rotor 1 with respect to the casing 20. To this end, each element 6 has a cylindrical base, e.g. as defined by a bushing, surrounding a reduced diameter end of the rotor 1 in spaced relation. In order to perform small adjusting motions, the elements e.g. bushes 6 are able to incline about their center. The center of the elements 6 is, however, unvariably defined with respect to the casing 20. The elements 6 have sufficient clearance to the diameter of the rotor parts surrounded so that a gas film which prevents metallic contact between running surfaces can be established between rotor 1 and each element 6. Such centering is made possible only by the vertical suspension of the rotor 1. In this position, there will be only negligible small radial forces which forces, however, cannot destroy the gas film.

Referring to FIG. 2, wherein like reference characters indicate like parts as above, a means for providing an emergency bearing 13 is incorporated below the thrust bearing 7 but remains completely unloaded in normal operation. The emergency bearing 13 commences operation on a bearing surface 27 formed in the casing 20 only in the event of the thrust bearing 7 being damaged and the rotor 1 descending so that the rotor 1 can be retained for a short time in a position in which no further damage occurs until the rotor 1 comes to a stop.

It is not essential for the thrust bearing 7 to be mounted above the rotor 1 by means of a shaft 2 of reduced diameter. The thrust bearing may also be disposed below the motor 12 and the impeller 11 so that the weight of the rotor 1 is transmitted under pressure on to the thrust bearing.

The use of two centering elements is appropriate. In special cases, it is either possible too use only one or in other cases more than two such elements.

What is claimed is:

1. A machine for conveying gases comprising
   at least one vertically disposed motor rotor;
   at least one impeller driven from said rotor;
   a gas-tight casing housing said rotor and impeller;
   a shaft connected to and extending from said rotor,
   said shaft being of smaller diameter than said rotor;
   a thrust bearing mounted in said casing and rotatably supporting said shaft therein to support the weight of said rotor from said casing;
   means including a bath of lubricating liquid for lubricating said thrust bearing with cooled liquid and a heat exchanger element for cooling the bath of lubricating liquid;
   at least one element centering said rotor in said casing, said element having a cylindrical bore surrounding said rotor in spaced relation thereto to form a film of pumped gas therebetween;
   a sealing gland disposed about said shaft between said bearing and said centering element;
   means for supplying gas to said gland to function as a barrier medium between said means for lubricating and said centering element; and
   means communicating a space above said bath with a position of lower pressure to produce an upward flow of gas in said gland.

2. A machine as set forth in claim 1 wherein one said centering element is disposed between said impeller and said rotor and another said centering element is disposed betwen said rotor and said thrust bearing.

3. A machine as set forth in claim 1 wherein each centering element is mounted in a diaphragm secured to said casing.

4. A machine as set forth in claim 1 wherein said centering element is disposed between said impeller and said rotor.

5. A machine as set forth in claim 1 wherein said thrust bearing is self-aligning within said casing.

6. A machine as set forth in claim 1 wherein said thrust brearing is a roller bearing.

7. A machine as set forth in claim 1 which further comprises means for forming an emergency thrust bearing upon movement of said rotor in a downward direction in response to failure of said thrust bearing.

8. A machine as set forth in claim 7 wherein said latter means is mounted below said thrust bearing within said casing.

9. A machine as set forth in claim 1 wherein said means for supplying gas to said gland delivers part of the conveyed gas to said gland as the barrier medium.

10. A machine as set forth in claim 1 wherein said means for lubricating includes a chamber about said thrust bearing for containing said bath of lubricating liquid.

11. A machine for pumping gases comprising
    at least one vertically disposed motor rotor;
    at least one impeller driven from said rotor for pumping a gas;
    a housing surrounding said rotor and impeller;
    a member subdividing said housing into two vertically aligned chambers;
    a shaft extending from said motor rotor and passing through said member;
    said shaft being of smaller diameter than said rotor;
    at least one element centering a reduced diameter end of said rotor within said housing and having a cylindrical bore surrounding said end in spaced relation to form a film of pumped gas therebetween;
    a thrust bearing in one of said chambers rotatably supporting said shaft to support said rotor and impeller;

means for lubricating said thrust bearing with cooled liquid including a bath of lubricating liquid immersing said thrust bearing therein;
a sealing gland disposed about said shaft within said member between said thrust bearing and said element; and
means for supplying gas to said sealing gland to function as a barrier medium between said chambers.

* * * * *